United States Patent [19]

Durand-Texte

[11] 4,252,142
[45] Feb. 24, 1981

[54] APPARATUS FOR DISCONTINUOUSLY DILUTING A LIQUID IN ANOTHER LIQUID, TO A GIVEN LEVEL OF CONCENTRATION

[76] Inventor: Gerard Durand-Texte, 115-123, Rue Leopold Rechossiere, Aubervilliers (Seine Saint-Denis), France

[21] Appl. No.: 70,447

[22] Filed: Aug. 28, 1979

[30] Foreign Application Priority Data

Sep. 8, 1978 [FR] France .............................. 78 25955

[51] Int. Cl.³ ............................................ G05D 11/03
[52] U.S. Cl. ........................... 137/101.27; 137/101.31
[58] Field of Search ...................... 137/101.11, 101.25, 137/101.27, 101.31, 205; 222/56, 64, 67, 68

[56] References Cited

U.S. PATENT DOCUMENTS

| 1,883,139 | 10/1932 | Walter | 137/101.25 |
|---|---|---|---|
| 2,678,917 | 5/1954 | Schoenfeld | 137/101.25 |
| 2,884,067 | 4/1959 | Marken | 137/101.25 X |
| 3,358,704 | 12/1967 | Wyatt | 137/101.31 X |
| 3,394,847 | 7/1968 | Garrard | 222/56 |
| 3,915,187 | 10/1975 | McCalla | 137/101.27 |

FOREIGN PATENT DOCUMENTS 1216087 12/1970 United Kingdom ................ 137/101.27

Primary Examiner—Robert G. Nilson
Attorney, Agent, or Firm—Mason, Kolehmainen, Rathburn & Wyss

[57] ABSTRACT

Apparatus for discontinuously diluting a liquid in another liquid, to a predetermined level of concentration, comprising a metering container provided with a means for automatically limiting the filling thereof to a predetermined level, a tank for liquid to be diluted, whose lower part is connected to the upper part of the metering container by a conduit, a dilution vessel whose lower part is connected to the lower part of the metering container, a means for permitting transfer of the diluted liquid from the lower part of the dilution vessel to an assembly for using the diluted liquid, a conduit for passing the diluting liquid into the dilution vessel, a valve which is interposed on the conduit carrying the diluting liquid into the dilution vessel, an aspirator means which is disposed on the conduit carrying the diluting liquid to the dilution vessel and positioned downstream of the valve.

5 Claims, 4 Drawing Figures

APPARATUS FOR DISCONTINUOUSLY DILUTING A LIQUID IN ANOTHER LIQUID, TO A GIVEN LEVEL OF CONCENTRATION

The present invention concerns apparatus for discontinuously diluting a liquid in another liquid, to a given level of concentration. Such apparatus may be used in particular for preparing a solution of Javelle water which is diluted to a given level of concentration, from concentrated Javelle water, in order to permit sterilisation of water.

Figure 1:
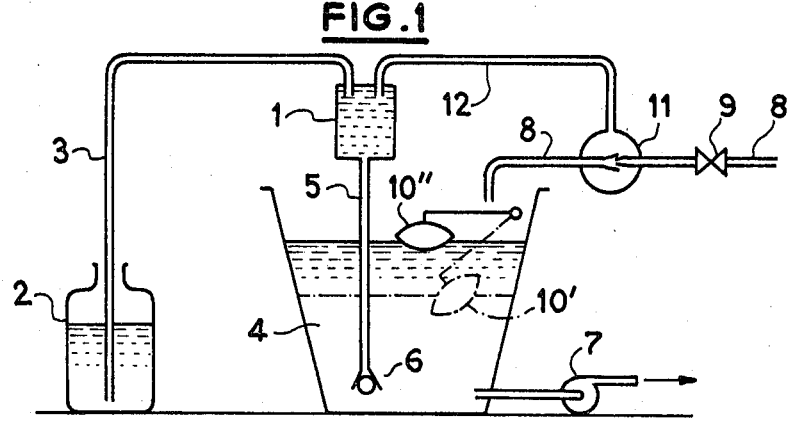
Figure 2:
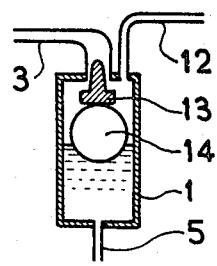
Figure 3:
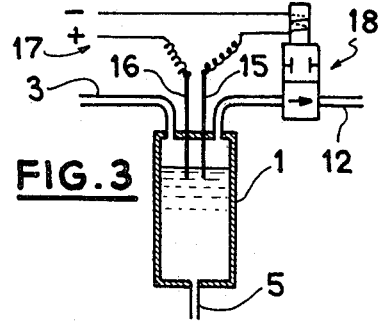
Figure 4:
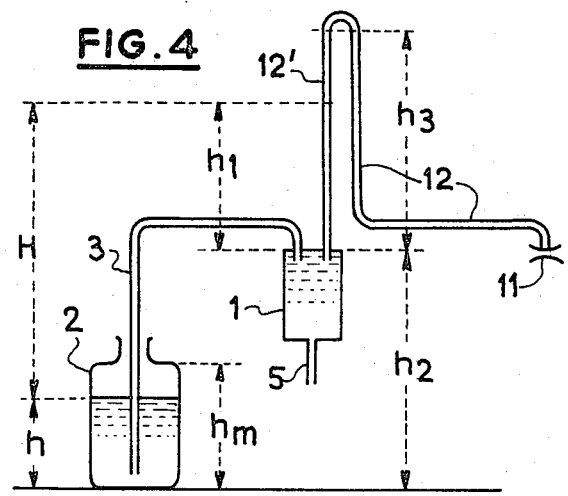

The apparatus according to the invention will now be described by way of a non-limiting embodiment illustrated diagrammatically in the accompanying drawings wherein:

FIG. 1 is a general view of the apparatus according to the invention,

FIGS. 2 to 4 respectively show three alternative forms of the means used for limiting the degree of filling of the metering container.

Referring to FIG. 1, the apparatus according to the invention comprises a metering or regulating container which is entirely closed, except for three conduits 3, 5 and 12 which are connected thereto. The metering container 1 is provided with a means, which will be described in greater detail hereinafter, for limiting the degree of filling of the metering container 1 to a predetermined level.

The apparatus according to the invention further comprises a tank 2 for the liquid to be diluted, which is disposed below the metering container 1 so that the level of the liquid in the tank 2 of liquid to be diluted is always below the level of the liquid in the metering container 1. A conduit 3 connects the lower part of the tank 2 to the upper part of the metering container 1.

There is also a dilution vessel 4 which is open in its upper part and which is disposed below the metering container 1 so that the level of the liquid in the dilution vessel 4 is always below the level of the liquid in the metering container 1. A conduit 5 connects the lower part of the dilution vessel 4 to the lower part of the metering container 1. The lower end of the conduit 5 is provided with a valve 6 for preventing the liquid in the dilution vessel 4 from passing into the coduit 5 while permitting the liquid in the conduit 5 to flow into the dilution vessel 4. The dilution vessel 4 is provided with a means for detecting the level of the liquid, which is for example in the form of a float 10 capable of oscillating between a lower limit position 10' and an upper limit position 10" which respectively correspond to the 'low' level and the 'high' level of liquid in the dilution vessel. In these two limit positions 10' and 10", the float 10 provides, in a manner which will be described in greater detail hereinafter, for control of a feed control valve or butterfly valve for the dilution vessel 4, and possibly other members which will also be described in greater detail hereinafter. A suitable means such as a pump 7 makes it possible for the contents of the dilution vessel 4 to be discharged to an assembly using the diluted liquid obtained in the dilution vessel 4. This assembly, when the apparatus according to the invention is used for diluting Javelle water to a predetermined level of concentration, may be a water distribution means, a swimming pool, etc.

The dilution vessel 4 is fed with diluting liquid in its upper part by way of a conduit 8 which includes a control valve or butterfly valve 9. As indicated above, the valve 9 is controlled by the means for detecting the level of liquid, with which the dilution vessel 4 is provided, that is to say, for example, the float 10. When the float 10 moves down into its lower limit position 10', it causes the valve 9 to open. On the other hand, it causes the valve 9 to close when it reaches its upper limit position 10". This control action may be effected by way of any suitable transmission means. For example, the valve 9 may be in the form of a float-type valve or control tap member wherein the float is formed by the float 10. However, in a preferred construction according to the invention, the valve 9 is an electrically operated valve of the type in which the flow of current in the emergisation coil causes the valve to open, and the float 10 controls the electrically operated valve by closing the supply circuit for the energisation coil, which causes the valve 9 to open, when the float 10 arrives at its lower limit position 10', while the float 10 opens the energisation coil supply circuit, to cause the valve 9 to close, when the float 10 reaches its upper limit position 10".

An aspirator or syphon means 11 is disposed on the conduit 8, downstream of the valve 9 in the direction of flow of the liquid to be diluted, that is to say, between the valve 9 and the end of the conduit 8 which opens above the dilution vessel 4. The aspirator means 11 is actuated by the flow of liquid to be diluted, which passes through the conduit 8, and is connected to the upper part of the metering container 1 by means of a conduit 12.

The above-described assembly operates in the following manner:

When the diluted liquid is taken from the dilution vessel 4 by means of the pump 7, the level of liquid in the dilution vessel 4 goes down until the float 10 is in its lower limit position 10'. When it reaches this lower limit position, the float 10 closes the circuit controlling the electrically operated valve 9, thereby causing opening of the electrically operated valve and causing the dilution vessel 4 to be supplied with diluting liquid by way of the conduit 8. The arrival of the float 10 at its lower limit position 10'may also cause the pump 7 to stop, so that the level of liquid rises in the dilution vessel 4.

From the moment at which opening of the valve 9 permitted circulation of the diluting liquid in the conduit 8, the aspirator means 11 comes into operation and establishes a certain degree of vacuum in the metering container 1 by way of the conduit 12. This vacuum causes the liquid to be diluted, which is contained in the tank 2, to be drawn into the metering container 1 by way of the conduit 3. As moreover the valve 6 is held in a closed condition by the depression obtaining in the metering container 1, the liquid to be diluted which is thus drawn in accumulates in the conduit 5 and the metering container 1 until the liquid reaches a predetermined level in the container 1. When the liquid reaches this predetermined level, a means which will be described in greater detail hereinafter and with which the container 1 is provided closes the conduit 3 or the conduit 12 so that the flow of liquid to be diluted, from the tank 2 into the metering container 1, is interrupted, although the vacuum continues to prevail in the upper part of the container 1, above the level of liquid, so that the liquid cannot flow away by way of the conduit 5 and the valve 6, into the dilution vessel 4. However, the level of liquid in the dilution vessel 4 continues to rise until the float 10 reaches its upper limit position 10". At that moment, the float 10 opens the circuit controlling the electrically operated valve 9, thus causing the valve 9 to be closed. The diluting liquid ceases to flow in the conduit 8 and to feed the dilution vessel 4. At the same time, the aspirator means 11 ceases to function and atmospheric air passes by way of the end of the conduit 8 into the aspirator means 11, into the conduit 12 and into the upper part of the metering container 1, which causes the liquid to be diluted, which is contained in the metering container 1 and in the conduit 5, to flow into the dilution vessel 4, by way of the conduit 5 and the valve 6. If desired, it is the possible to begin again to draw diluted liquid from the dilution vessel 4 by means of the pump 7. Thus, between two operations of drawing liquid from the dilution vessel 4, down to the 'low' level, a given volume of diluting liquid, corresponding to the capacity of the dilution vessel between the 'low' level and the 'high' level, will have been introduced into the dilution vessel and moreover, a given volume of liquid to be diluted, which has accumulated in the metering container 1 and in the conduit 5, will have been introduced into the dilution vessel 4. The mixture between the given volume of diluting liquid and the given volume of liquid to be diluted, in the dilution vessel 4, results in dilution, to a predetermined level of concentration, of the liquid to be diluted. Thus, the above-described apparatus properly achieves the aim which had been set, namely diluting a liquid in another liquid, to a predetermined level of concentration.

Reference will now be made to three non-limiting embodiments of the invention in order to describe the manner in which filling of the metering container 1 can be limited to a predetermined volume.

A first means for limiting the filling action is shown diagrammatically in FIG. 2. As shown in FIG. 2, a valve 13 is applied against the orifice of the conduit 3 in the cover of the metering container 1 under the action of a float 14 when the level of liquid in the metering container 1 reaches a given height. In fact, the device which is thus diagrammatically shown in FIG. 2 may be formed in practice by a commercially available float-type valve, provided however that such a valve must be capable of resisting a corrosive or oxidising action of the liquid to be diluted if the liquid is for example concentrated Javelle water.

A second means for limiting the degree of filling of the metering container 1 is shown in FIG. 3 wherein two electrodes 15 and 16 pass sealingly through the cover of the metering container 1. The lower ends of the electrodes are adjusted at the predetermined height fixed for filling of the metering container 1. The electrodes 15 and 16 are connected to a control circuit 17 which is supplied by means of an electrical power source and into which is connected the energisation coil of an electrically operated valve 18 mounted on the conduit 12 connecting the aspirator means 11 to the upper part of the metering container 1. When the level of liquid to be diluted in the metering container 1 reaches a predetermined height, the liquid to be diluted, which is assumed to be electrically conducting, comes into contact with the lower ends of the electrodes 15 and 16 and thus makes an electrical connection between the electrodes, causing closure of the circuit 17 and energisation of the coil of the electrically operated valve 18, thereby causing the electrically operated valve to close and causing an interruption in the supply of liquid to be diluted, to the metering container 1, by aspiration through the conduit 3. When the float 10 reaches its upper limit position 10" in the dilution vessel 4 and interrupts the supply of electricity to the electrically operated valve 9, as described above, thereby causing the valve 9 to close, the float 10 will at the same time cut off the power supply to the electrically operated valve 18, thus causing the valve 18 to open and thus permitting atmospheric air to enter by way of the end of the conduit 8, the aspirator means 11 and the conduit in the upper part of the metering container 1. The effect of this is to permit discharge of the liquid to be diluted, which is contained in the metering container 1 and in the conduit 5, into the dilution vessel 4, by way of the conduit 5 and the valve 6.

It will be appreciated that the construction shown in FIG. 3 can be used only if the liquid to be diluted conducts electricity and the nature of the electrodes 15 and 16 must be such that they can withstand a possible corrosive or oxidising action on the part of the liquid to be diluted. It should also be noted that, instead of being installed on the conduit 12, the electrically operated valve 18 could also be mounted on the conduit 3, although in this case the valve 18 must be capable of withstanding a possible corrosive or oxidising effect on the part of the liquid to be diluted, which is not necessary when the electrically operated valve 18 is mounted on the conduit 12.

FIG. 4 shows an entirely static construction for limiting the degree of filling of the metering container 1. In this construction, the conduit 12 which connects the upper part of the metering container 1 to the aspirator means 11 has, projecting from the metering container 1, a vertical limb or branch 12' whose height is such that the liquid to be diluted, which is drawn into the container 1 by the aspirator means 11, cannot reach the upper end of the vertical limb or branch 12'.

If H is the maximum depression which can be generated by the aspirator means 11, h is the level of the liquid to be diluted in the tank 2, h2 is the height of the cover of the metering container 1, measured from the same starting level as level h, and h1 is the height of the liquid to be diluted, in the vertical limb or branch 12' of the conduit 12, the result is the following equation:

$$h1 = H + h - h2$$

It is necessary therefore for the height of the vertical limb or branch 12' to be greater than the maximum value of h1, this maximum value being attained when the level h in the tank 2 itself reaches its maximum value hm corresponding to complete filling of the tank 2.

As can be seen from the above-specified equation, the height h1 of the liquid to be diluted in the vertical limb or branch 12' depends on the level h of the liquid in the tank 2. In fact, h1 may vary by an amount hm, depending on whether the tank 2 is completely full or completely empty. However, as the cross sectional area of the vertical branch or limb 12' was deliberately selected at a very small value, the variation in volume corresponding to the variation in height hm of the liquid to be diluted in the vertical limb or branch 12' is negligible relative to the much greater volume of the assembly formed by the metering container 1 and the conduit 5. Consequently, the entirely static means, described above with reference to FIG. 3, makes it possible to determine, with a highly satisfactory degree of accuracy, the volume of liquid to be diluted which will be subsequently introduced into the dilution vessel 4. The attraction of this static arrangement is apparent as it is particularly reliable in its mode of operation and adapting it to use with corrosive liquids does not give rise to any particular difficulty.

It will be appreciated that the above-described embodiments are used simply to illustrate the subject of the invention and are in no way limiting so that it is possible to envisage all other solutions which fall within the scope of the invention as defined by the claims. In particular:

if the requirements in respect of the supply to the assembly which makes use of the diluted liquid permit it, it is possible for the pump 7 selected to have a sufficiently low output for it to be allowed to remain in continuous operation without the degree of accuracy in respect of dilution being noticeably influenced thereby;

instead of the conduit 3, the valve 13 may close the conduit 12;

the electrodes 15 and 16 could be replaced by a float-type cut-off means.

I claim:

1. Apparatus for discontinuously diluting a liquid in another liquid, to a predetermined level of concentration, characterised in that it comprises:
   a metering container (1) provided with a means for automatically limiting the filling thereof to a predetermined level,
   a tank (2) for liquid to be diluted, whose lower part is connected to the upper part of the metering container (1) by a conduit (3) and in which the level of liquid is always below the level of liquid in the metering container (1),
   a dilution vessel (4) whose lower part is connected to the lower part of the metering container (1) by means of a conduit (5) provided at its lower end with a valve (6) for preventing the flow of a liquid from the dilution vessel (4) towards the metering container (1), in which dilution vessel the level of liquid is always below the level of liquid in the metering container (1),
   a means (7) for permitting transfer of the diluted liquid from the lower part of the dilution vessel (4) to an assembly for using the diluted liquid,
   a conduit (8) for passing the diluting liquid into the dilution vessel (4),
   a valve (9) which is interposed on the conduit (8) carrying the diluting liquid into the dilution vessel (4) and actuated automatically by a means for detecting the level of liquid in the dilution vessel, so as to be opened when the level of liquid falls below a lower limit and so as to be closed again when the level of liquid exceeds an upper limit, and
   an aspirator means (11) which is disposed on the conduit (8) carrying the diluting liquid to the dilution vessel (4) and positioned downstream of the valve (9) in the direction of flow of the diluting liquid in the conduit (8), the aspirator means being connected to the upper part of the metering container (1) by a conduit (12) and being capable, upon being actuated by the flow of diluting liquid in the conduit (8) carrying the diluting liquid to the dilution vessel (4), of producing a vacuum in the metering container (1).

2. Apparatus according to claim 1 characterised in that the means for limiting the degree of filling of the metering container (1) to a predetermined level is a check valve or a control valve actuated by a float, for closing the conduit (3) connecting the tank (2) for the liquid to be diluted and the metering container (1) or the conduit (12) connecting the aspirator means (11) and the metering container (1) when the predetermined level is attained in the metering container.

3. Apparatus according to claim 1 characterised in that the means for limiting the degree of filling of the metering container (1) to a predetermined level comprises a pair of electrodes (15, 16) between which the liquid filling the metering container (1) forms a conducting connection when said liquid reaches the predetermined level, thereby closing the control circuit (17) of an electrically operated valve (18) which is disposed on the conduit (3) connecting the tank (2) for liquid to be diluted, to the metering container (1), or the conduit (12) connecting the aspirator means (11) and the metering container (1).

4. Apparatus according to claim 1 characterised in that the means for limiting the degree of filling of the metering container (1) to a predetermined level comprises, on the conduit (12) connecting the upper part of the metering container (1) to the aspirator means (11) and at the take-off from the metering container (1), a vertical limb (12') which is of very small cross-section and whose height is such that the liquid to be diluted, which is drawn by suction from the tank (2) of liquid to be diluted, under the action of the aspirator means (11) and by way of the metering container (1), cannot reach the upper end of said limb.

5. Apparatus according to any one of claims 1 to 4 characterised in that the means for detecting the level of liquid in the dilution vessel is a float (10) which, in its low limit position (10'), closes an electrical circuit whose current controls opening of the valve (9) disposed on the conduit (8) for feeding the dilution vessel (4) with diluting liquid, and possibly supplies the control circuit (17) of the electrically operated valve (18) which is disposed on the conduit (3) connecting the tank (2) for liquid to be diluted, to the metering container (1), or on the conduit (12) connecting the aspirator means (11) to the metering container (1), while in its high limit position (10''), the float (10) opens said same electrical circuit, thereby causing the valve (9) to be closed and the valve (18) to be opened.

* * * * *